Dec. 20, 1938. O. E. CONKLIN 2,140,515
HOLDER FOR SENSITIZED ELEMENTS
Filed Aug. 19, 1937
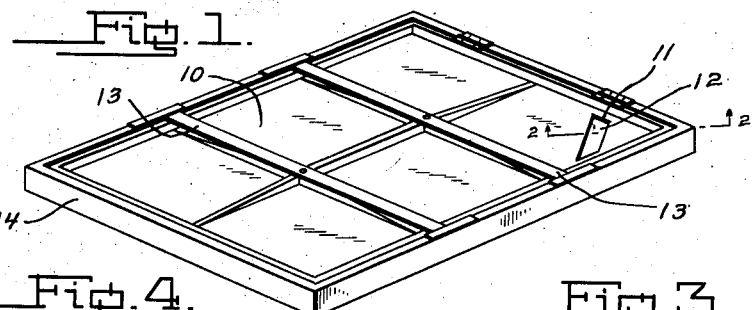
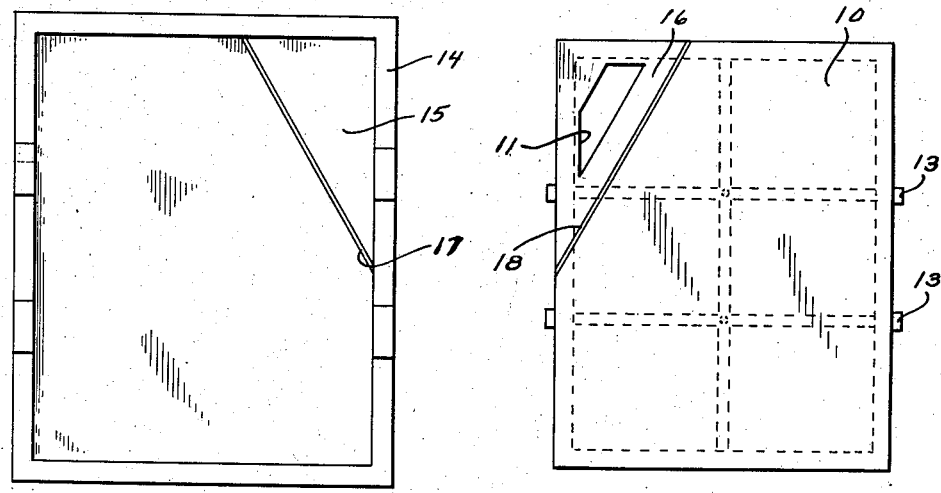
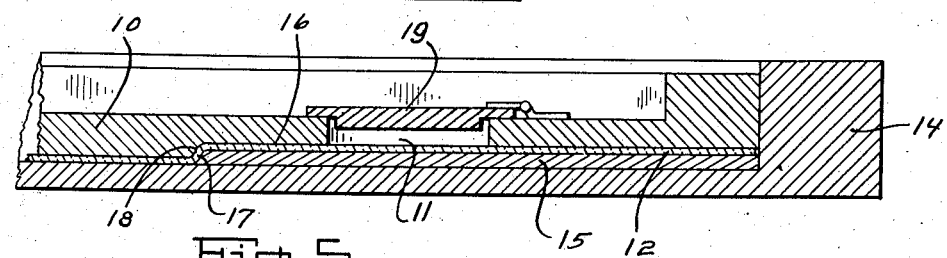
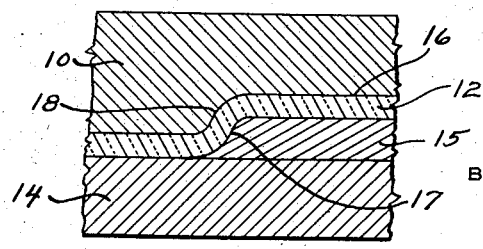
INVENTOR.
Oliver E. Conklin.
BY
ATTORNEY Patented Dec. 20, 1938

2,140,515

UNITED STATES PATENT OFFICE 2,140,515

HOLDER FOR SENSITIZED ELEMENTS

Oliver E. Conklin, Parlin, N. J., assignor to Du Pont Film Manufacturing Corp., Inc., New York, N. Y., a corporation of Delaware Application August 19, 1937, Serial No. 159,946

4 Claims. (Cl. 250—68)

This invention relates to radiography and more particularly to an improved cassette or X-ray film holder. A principal object of this invention is to provide a cassette that will permit the application of indicia to the X-ray film or sensitized element at any time after the film or element has been enclosed in the cassette. A further object is to provide such a cassette that will permit the application of indicia to the film in the presence of any ordinary room illumination. A further object is to provide such a cassette that will confine the exposure of fogging of the film to the area receiving the indicia. Additional and more specific objects will more plainly appear from the detailed specification and drawing presented herewith in exemplification and not in limitation of the present invention.

Like reference characters represent like elements in the accompanying drawing which represents diagrammatically in:

Fig. 1, a perspective view of the cassette enclosing a film ready to be marked;

Fig. 2, a vertical cross-section taken on the line 2—2 in Fig. 1;

Fig. 3, a plan view of the top member or door of the cassette;

Fig. 4, a plan view of the body of the cassette showing the recessed bottom member thereof; and Fig. 5, a vertical cross section detail of the light-lock shown in Fig. 2.

In Fig. 1 the cover of the cassette is shown at 10 embodying the opening 11 through which inscriptions may be applied to the film 12 showing therethrough. The cover member 10 is provided with pressure clamps 13 for providing pressure contact with the recessed body member 14.

The body member 14 is provided with a raised corner element 15 made of material preferably impervious to X-ray as shown in Fig. 4. The top member is provided with an opening 11 as shown in Fig. 3 and its under side is provided with a recess at 16 as shown in Fig. 2 adapted to interfit with the member 15 shown in Fig. 4. The edge of the member 15 is bevelled preferably at an angle of approximately 60° as shown at 17 in Figure 2 and a like bevel is applied to the recess portions of the cover 10 as shown at 18 in Fig. 2. These bevels are so formed that they will grip the film 12 as a result of the pressure applied by the pressure clamps 13 and form thereby a light lock at 17 and 18 as shown in Fig. 2 and Fig. 5.

In operation the technician places the X-ray film in the cassette in the usual manner and clamps it therein in the usual way by means of the clamps 13. This will force the marginal or corner portion of the film 12 into the position shown at 17 and 18 in Fig. 2 and prevent the passage of light thereby so that the film may be readily marked with any desired indicia through the opening 11 at any time before, during or after the exposure of the cassette to the X-rays. Thus, any fogging light admitted through the opening 11 is effectively confined to the corner of the film above the opening 11. When the member 15 is made of a material impervious to X-rays the indicia will be further protected from subsequent fogging by X-rays during the use of the cassette. Subsequent fogging of the indicia may be also prevented by providing the opening 11 with a hinged or slidable light-tight cover that may be opened for the application of the indicia and subsequently closed while the cassette is in use or being exposed to X-ray.

While a marginal diagonal corner aperture and the herein described light lock is shown in the preferred embodiment of the present invention this aperture and light lock are not limited to the position and shape shown. If desired, or if convenient for special use they may be placed elsewhere on the margin of the cassette and their size or shape may be modified to suit any special condition. While it is also preferred to form the bevelled edges of the light lock shown at 17 and 18 with an angle of approximately 60° these edges may also operate successfully without the bevel or with the usual 90° edges, or the angle or the edges may be changed or rounded to suit special conditions or special thicknesses of film.

While the foregoing specification sets forth the preferred embodiments of the present invention it is intended to include all variations and modifications within the spirit and scope of the appended claims.

I claim:

1. A cassette comprising in combination a body member and a cover member held in light-proof clamped relation thereto, a sensitized element enclosed between said members, a marginal recess in the film-contacting surface of one of said members and an interfitting marginal elevation in the other of said members, a closable marginal aperture embodied in one of said members located within the area of said interfitting marginal elevation and recess.

2. A cassette for X-ray film, comprising in combination a body member for holding a sensitized film element and a cover member held in light-proof clamped relation thereto, a marginal bevel-edged recess in the film-contacting surface of one of said members, an interfitting marginal bevel-edged elevation in the film contacting surface of the other of said members, a closable aperture embodied in one of said members and positioned between said bevelled edges and the edge of said cassette so that said bevelled edges will isolate the area of a sensitized film element which may be enclosed under said aperture in a light lock.

3. A cassette for X-ray film, comprising in combination a body member and a cover member held in light-proof clamped relation thereto, a marginal recess in the film-contacting surface of one of said members, an interfitting marginal elevation impervious to light and X-rays in the film contacting surface of the other of said members, a closable aperture embodied in one of said members and positioned between the interfitting edges of said recess and said elevation and the edge of said cassette so that said interfitting edges isolate the area of said film under said aperture in a light lock.

4. A cassette comprising a body member having a recessed flat bottom which is adapted to receive a sensitized film element, said bottom having an elevated plane surface portion in one corner, the edge between the bottom and the elevated surfaces being beveled, an interfitting cover member in light-proof clamped relation with the body member and having a flat bottom which contains an interfitting recessed portion of substantially the same area as said elevated portion and a marginal aperture located within the area of the recessed portion and a light-proof cover for said aperture attached to said cover member.

OLIVER E. CONKLIN.